A. WAYDITCH.
KINETOSCOPE FOR PROJECTING STEREOSCOPIC MOVING PICTURES.
APPLICATION FILED OCT. 22, 1914.
Patented Aug. 27, 1918.
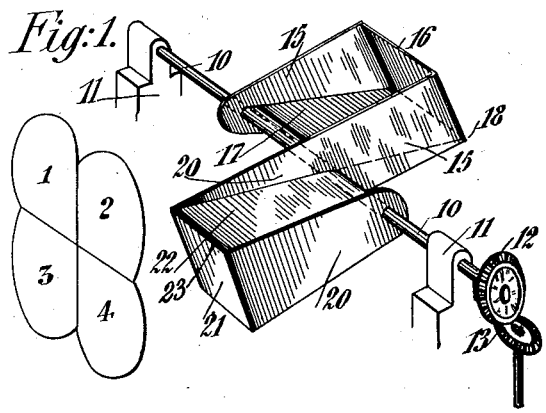
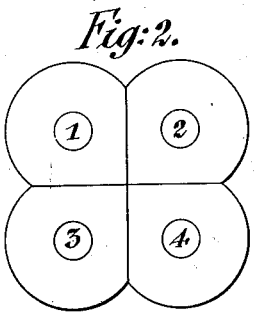
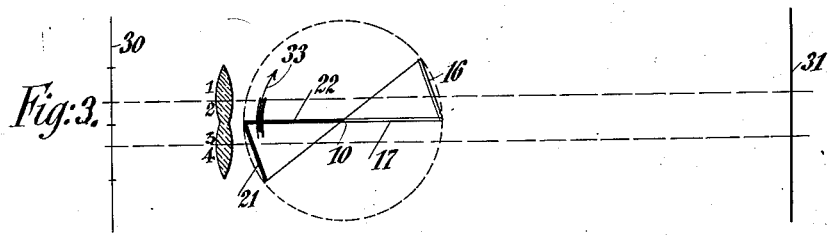
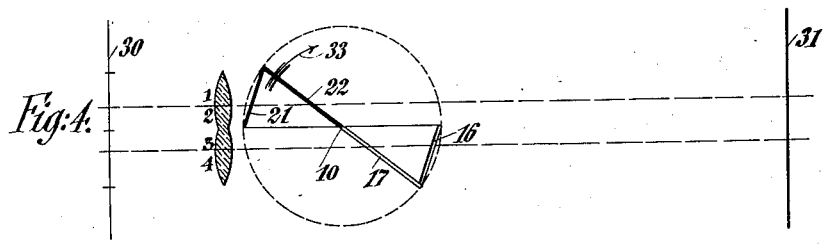
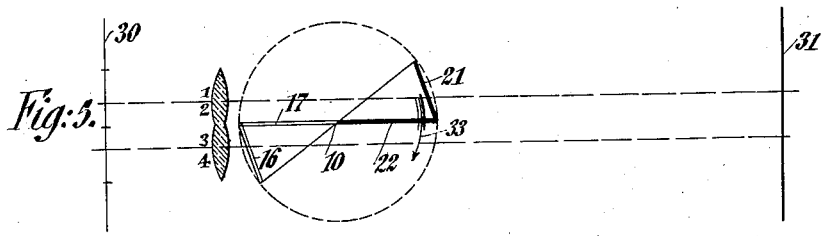
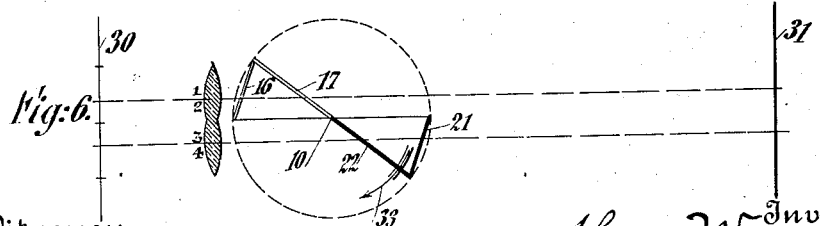

UNITED STATES PATENT OFFICE.

ALOYS WAYDITCH, OF NEW YORK, N. Y.

KINETOSCOPE FOR PROJECTING STEREOSCOPIC MOVING PICTURES.

1,276,838.

Specification of Letters Patent. Patented Aug. 27, 1918.

Application filed October 22, 1914. Serial No. 867,997.

*To all whom it may concern:*

Be it known that I, ALOYS WAYDITCH, a citizen of the Kingdom of Hungary, residing in New York, in the borough of Manhattan, county and State of New York, have invented certain new and useful Improvements in Kinetoscopes for Projecting Stereoscopic Moving Pictures, of which the following is a specification.

The invention relates to an improved kinetoscope for projecting stereoscopic moving pictures, and more particularly has relation to the invention described in my Patent Number 1,071,837 of September 2, 1913. The film resulting from the taking-camera shown in said Letters Patent has the left and right eye pictures arranged one under the other alternately as 1, 2, 1, 2, etc. These alternating left and right eye pictures must be projected to the left and right side respectively of the screen, for which purpose, according to my present invention, the lens system of the projecting apparatus is arranged substantially as follows:

The usual projecting medium is composed of two convex lenses in a common tube, each of these lenses having a focus of about five inches. For the purpose of projecting stereoscopic pictures, the front lens is removed and only the rear lens is retained. The front lens is replaced by a group of four convex lenses, each having a focus of about five inches, and about one inch in diameter. These four lenses are placed in the same vertical plane and close to each other, and a shutter is provided which will permit the use of these four lenses in pairs, each pair alternating with the others.

The invention is shown in the accompanying drawing, and will be more fully described hereinafter and finally pointed out in the claim.

In the drawing,

Figure 1 is a perspective view of the lens-group and the shutter coöperating therewith, Fig. 2 is a front view of the lenses, Fig. 3 is a diagram showing the lenses, and shutter coöperating therewith, in one position, Figs. 4, 5, and 6 are similar views showing the apparatus in other positions.

Similar characters of reference indicate the same parts throughout the various views.

Referring to the drawing, and more particularly to Figs. 1 and 2, four lenses each having two straight sides, are arranged in the same vertical plane with their straight sides abutting. For convenience the lenses are in the drawing numbered consecutively 1, 2, 3 and 4. The lenses numbered 1 and 3, considering them from the film side, project the left-eye pictures, and the lenses numbers 2 and 4 project the right-eye pictures, of the film produced by means of the patent above referred to. Each of these lenses projects one picture on the screen. A sufficient part of the lenses is ground off so that the optical axes of both pairs of lenses are brought near to each other. The result of this circumstance is that two separated pictures are sent to the screen from a single picture of the film and these stand on the screen like the well-known stereoscopic double photographs.

As the principle of stereoscopic sight is that the right eye shall not see what the left eye sees, and vice versa, means are provided for producing the appearance and disappearance of these pictures alternately on the screen.

For this purpose a shutter is provided comprising a shaft 10 rotatable in bearings 11, which shaft 10 has secured thereto a gear-wheel 12 meshing with a pinion 13, which receives its motion from a suitable motion-transmitting means not shown in the drawing. On the shaft 10 are mounted two shutter boxes, exactly alike, but differing in position. One shutter-box consists of side-walls 15 and a cross-wall 16, and a wall 17 extending from the edge 18 of the cross-wall 16 to the shaft 10. The other shutter-box has the side-walls 20, the cross-wall 21 and the wall 22 extending from the shaft 10 to the edge 23 of the cross-wall 21. The general arrangement of the walls just described is such that they operate in the manner shown in Figs. 3 to 6 when the said shutter is rotated on its axis.

The lower pair of lenses 3, 4, have like functions, as the upper pair. As the drawing shows, the contacting parts are taken off not only between lenses 1 and 2 respectively and between lenses 3 and 4 respectively, but also between lenses 1 and 3 and lenses 2 and 4. The lacking parts are larger here than between the horizontal neighbors as the optical axes have to come nearer to each other, that is, the lower pair of lenses have to project the pictures to the same parts of the screen where the pictures were projected by the upper pair of lenses.

It will be seen that in the projecting apparatus, the aperture must be enlarged so as to expose two pictures. The projection is made with two pictures standing one under the other. The upper of these pictures is divided into two pictures for the screen by means of the upper pair of lenses. The lower picture on the film, by means of the lower pair of lenses is likewise reproduced. When such a projection is viewed without any shutter and without revolving the handle of the projector, there is seen on the screen two pictures adjacent each other, one for the left eye and one for the right eye. The pictures are not quite clean or clear, as the pictures projected through the lower pair of lenses are not quite the same as the pictures sent through the upper pair of lenses, as the latter shows an earlier phase of the motion. The pictures do not pass through the middle of the lenses because of the circumstance that the focus of each of the lenses is eccentric, so the direction of the rays coming through the film is oblique. Therefore, each of the pictures on the screen suffers some deformation at its outermost periphery. This deformation is corrected by placing the four lenses around their common center or chief optical axis, so that the inner edges of the same should be nearer the screen than their periphery. Hence it is necessary to arrange an alternate disappearance and appearance of these four pictures on the screen and this is obtained by means of the shutter referred to, a result of which is that the pictures going through lenses 1 and 4 respectively, and through 2 and 3 appear on the screen contemporarily. First appears the pictures passing through the lenses 1 and 4 (left and right) contemporarily, afterward pictures passing through lenses 2 and 3, then again (the film having advanced) 1 and 4, 2 and 3, 1 and 4, 2 and 3 . . . etc., alternately. The result is that on the screen, a clear and moving double picture is produced.

Thus, referring to Fig. 3, which shows the parts diagrammatically in substantially the same position as shown in Fig. 1, the wall 16 blocks the path of the picture passing through the lens 1 and the wall 21 blocks the path of the picture passing through the lens 4. The film is indicated by 30 and the screen is indicated by 31.

In Fig. 4 the portion of the shutter has been changed and the wall 21 blocks the picture passing through the lens 2 and the wall 16 blocks the picture passing through the lens 3, whereas the pictures passing through the lens 1 and 4 are free to pass to the screen.

In Fig. 5 the wall 16 blocks the lens 3 and the wall 21 blocks the lens 2, whereas the pictures passing through lenses 1 and 4 pass to the screen 31.

In Fig. 6 the wall 16 blocks the path of the picture passing through the lens 1, and the wall 21 blocks the path of the picture passing through the lens 4, whereas pictures are free to pass through the lenses 2 and 3, and can thus be shown on the screen 31. The direction of movement of the device in Figs. 3 to 6 is shown by the arrow 33. At the phase shown, for instance, in the drawing of Fig. 6, the rays are closed off of the picture going through the left upper lens, number 1. Contemporarily the way is open for the rays going through the right upper lens, number 2. The result on the screen is a double picture made through the lenses 3 and 2, 3 being for the left eye and 2 being for the right eye. By rotating the device from the position shown in Fig. 6 to the position shown in Fig. 3, the opening of lens 1, by the posterior part of the boxshutter (at the position indicated by the figure) and the closing of lens 3 through the succeeding phase of the posterior part of the box shutter (at the position indicated by the figure) takes place, and contemporarily on the right side, the opening of lens 4 begins and the closing of lens 2 symmetrically with the foregoing, through the anterior part of the box shutter (at the position indicated by the figure). In the meantime the picture changes and the light is cut off from the screen by the ordinary shutter 1$^a$ of the projector. When the shutter gets into the position shown in Fig. 4, the lens 1 appears with the next following picture for the left eye and the lens 4 reproduces again the same picture as projected through the lens 1 in the last position, in Fig. 6. The box shutter is continuously rotating so that the time to change from the positions shown in Figs. 4 and 6 to the positions shown in Figs. 5 and 3 respectively, must be longer than the changing from the positions shown in Figs. 3 and 5 to Figs. 4 and 6 respectively; as during the former position, the pictures are showing on the screen, while in the latter positions the ordinary shutter 1$^a$ of the projector closes and the film is moved, this period of time being very small. The effect of the box shutter is the same while it is moving from the positions shown in Figs. 4 and 6 to the positions shown in Figs. 5 to 3. Any further movement from the positions shown in Figs. 3 and 5, would cause the left shutter to obstruct the left picture and permit the right picture to be projected on the left of the screen, and vice versa, if the ordinary shutter remained open, and the film unmoved, so that the ordinary shutter 1$^a$ is closed during these periods, and the film is moved as above pointed out. At a point between these two phases the picture changes, twice at each revolution of the axis 10, the result of this changing being that the picture which was projected through lens 1 now will be projected again through lens 3 and appears on the same portion of the screen on which it was projected before through the lens 1. At the same moment, the next following picture is standing behind the lenses 1 and 2, the shutter position controlling the proper projection of the right and left pictures to the right and left sides of the screen respectively. The same relation exists between the lenses 2 and 4, the function of which with respect to lenses 1 and 3 is alternating. The film used in this projecting apparatus, it will be understood, results from a taking camera constructed according to my United States Patent No. 1,071,837, dated September 2d, 1913, so that the pictures are arranged on the film in such manner that the left and right eye pictures, which are one under the other, alternate as left-right, left-right, and so forth. The lenses 1 and 3 project every first picture and the lenses 2 and 4 every second picture alternately to the right and to the left on the screen respectively, the result being that both eyes of the observer have on the screen their own right and left pictures continuously in juxtaposition. The positions of the box shutter when the ordinary shutter 1ª is open for projection of the picture are indicated in Figs. 4 and 6, the ordinary shutter being closed and the film being moved while the box shutter passes through the positions indicated in Figs. 3 and 5. Therefore the right eye picture that is projected through lens 2 in Fig. 6 will be again projected in Fig. 4 through lens 4, that is, the right eye picture which appeared in Fig. 6 through lens 2 is exposed until the box shutter is in the position shown in Fig. 3. Before their movement the function of the usual shutter has started through which the whole aperture is covered. During this function of the usual shutter the film unit, which in Fig. 6 was projected through lens 2, is again projected in Fig. 4 through lens 4. The effect is the same as if the film had not been moved from its previous position, and the continuity of the projection would have been broken, only through the function of the ordinary shutter, which happens at any usual projection. The complete cycle of operation is as follows: The film is advanced twice, the ordinary shutter operated twice and the box shutter rotated once, the same film unit for both right and left pictures, appearing successively twice on the screen.

These pictures should be viewed through the well known optical prisms with dirigible breaking angle.

I have shown one embodiment of the invention, but it is clear that changes may be made therein without departing from the spirit of the invention as defined in the appended claim.

I claim:

An improved projecting system for projecting right and left pictures upon a screen, comprising a projecting apparatus provided with an exhibitor's aperture plate of double height, a film having lineally alternating right and left pictures, means for intermittently moving said film before said aperture plate, a shutter device adapted to be closed during the moving of the film, projecting means adapted to project double laterally adjacent projections of said right and left pictures and controlling means adapted to be moved during moving of the film and adapted to control the simultaneous projection of right and left pictures from said projecting apparatus, respectively laterally adjacent the right and left side of screen, each picture appearing twice on the same portion of the screen, said two appearances being separated by one shutter function, said controlling means comprising a pair of rotating wings one of said wings adapted to obscure right eye pictures while the other obscures left eye pictures, and to expose left eye pictures while the other exposes right eye pictures.

In testimony that I claim the foregoing as my invention I have signed my name in presence of two subscribing witnesses.

ALOYS WAYDITCH.

Witnesses:
    Jos. Bisbano,
    Diana Gordon.